United States Patent [19]

Maxam et al.

[11] Patent Number: 4,632,407
[45] Date of Patent: Dec. 30, 1986

[54] INSIDE/OUTSIDE CHUCKING DEVICE

[76] Inventors: Donald R. Maxam, 12737 Moore Park, Studio City, Calif. 91604; Allen B. Maxam, 924 N. Ontario, Burbank, Calif. 91505

[21] Appl. No.: 550,599

[22] Filed: Nov. 10, 1983

[51] Int. Cl.⁴ .............................................. B23B 31/10
[52] U.S. Cl. ................................ 279/121; 279/1 DA; 279/47; 279/70
[58] Field of Search ............... 279/1 DA, 1 DC, 2 R, 279/7, 14, 33, 57, 70, 74, 121, 122, 37, 43, 47, 48, 50

[56] References Cited

U.S. PATENT DOCUMENTS

| | | | |
|---|---|---|---|
| 3,076,660 | 2/1963 | Siena | 279/2 R |
| 3,168,322 | 2/1965 | Dziedzic | 279/50 X |
| 3,497,226 | 2/1970 | Hohwart et al. | 279/50 X |
| 3,542,383 | 11/1970 | Farley et al. | 279/2 R |
| 3,603,605 | 9/1971 | Webster, Jr. | 279/1 DA |
| 3,744,809 | 7/1973 | Bennett | 279/123 X |
| 3,871,670 | 3/1975 | Wright | 279/2 R |
| 4,416,459 | 11/1983 | Morawski et al. | 279/2 R |

FOREIGN PATENT DOCUMENTS 2735966  8/1978  Fed. Rep. of Germany ........ 279/14

Primary Examiner—Gil Weidenfeld
Assistant Examiner—Glenn L. Webb
Attorney, Agent, or Firm—Beehler, Pavitt, Siegemund, Jagger & Martella

[57] ABSTRACT

For selective outside or inside chucking of a workpiece on a lathe use is made of a base unit split to provide a set of three or more holding segments capable of being either contracted for grasping the exterior of a workpiece or spread for grasping the interior of a workpiece. There is a set of jaws complementary with respect to the segments and designed to accommodate a workpiece of selected size. Each individual jaw in turn is mounted on one of the holding segments with an attachment permitting removal of the jaw for replacement with one of the jaws of a different set for holding a workpiece of different size.

13 Claims, 7 Drawing Figures

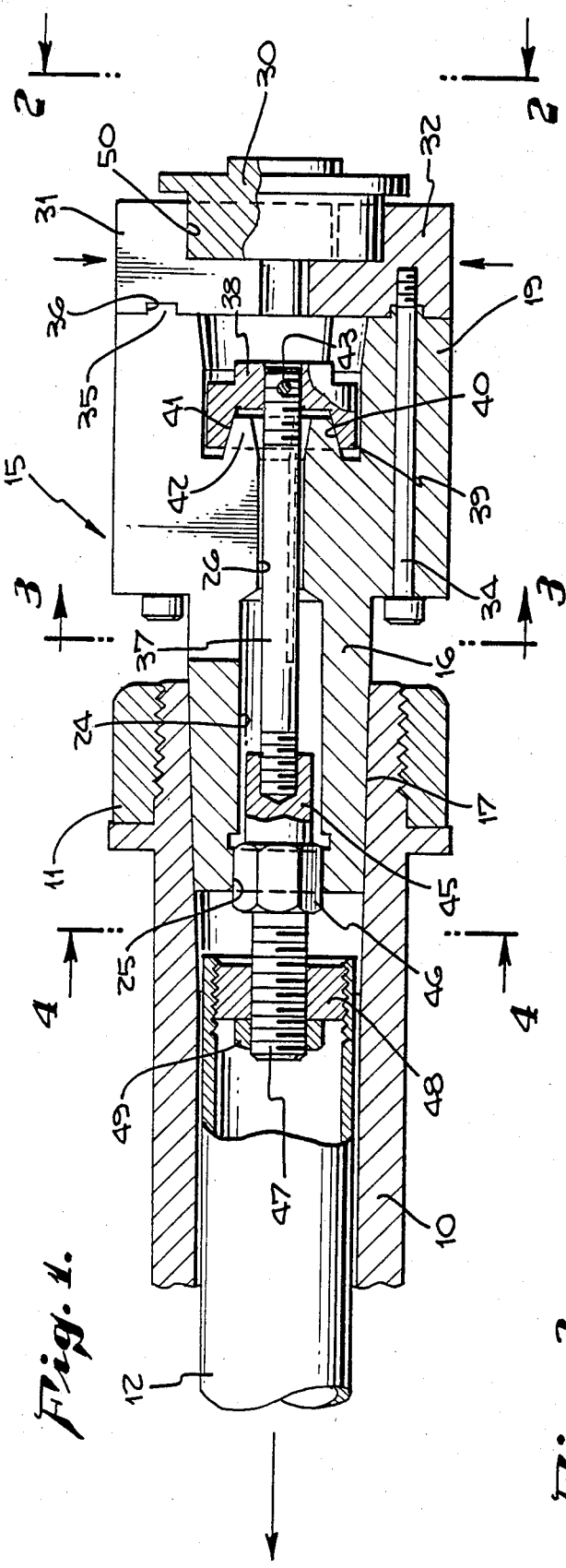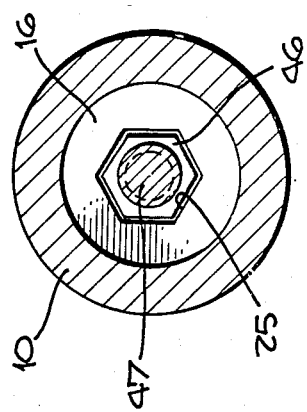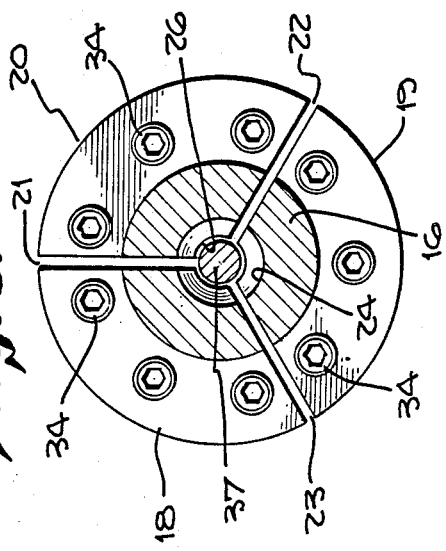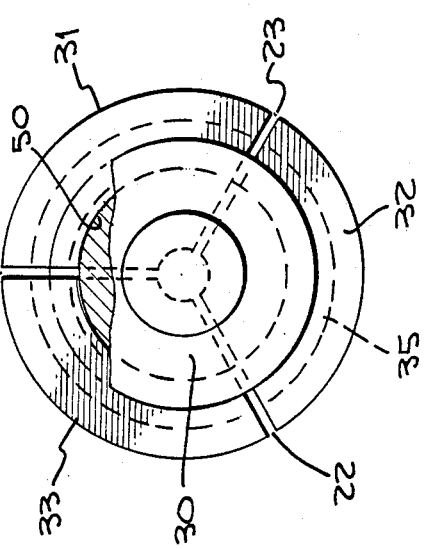

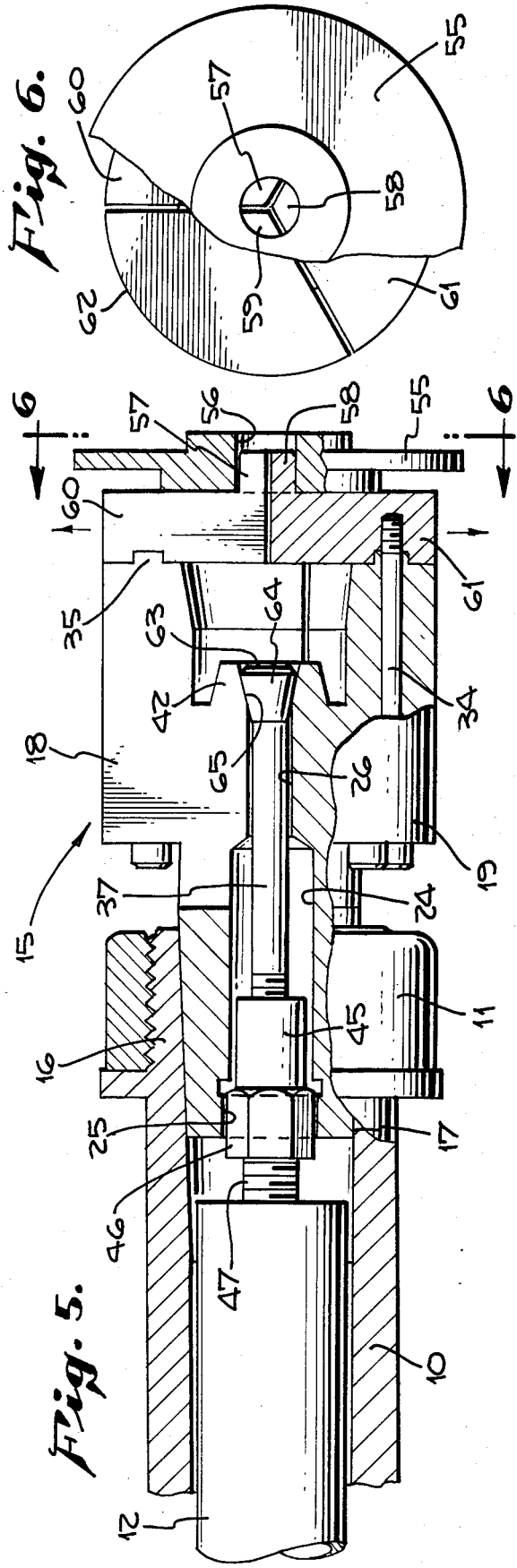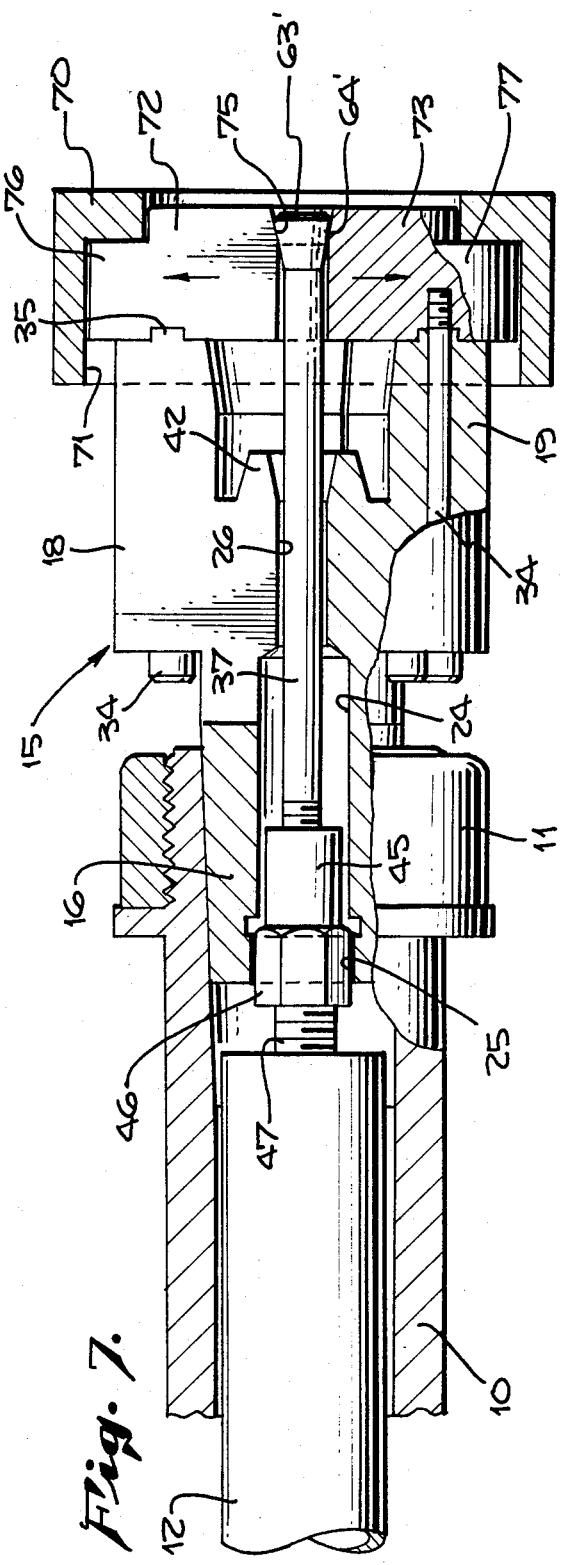

INSIDE/OUTSIDE CHUCKING DEVICE

SPECIFICATION

When chucking a workpiece in a lathe for performing machining operations on the workpiece, it has long been customary to provide a chucking device consisting of circumferentially spaced multiple segments capable of being forced together to grasp the outside circumference of the workpiece. Devices of this nature are commonly made reference to as collet-type chucking devices.

On those occasions where the workpiece has a hole or interwall recess, a mandrel may be employed. When used as a mandrel, the multiple segments are arranged so as to expand radially outwardly in order to grasp some appropriate interior surface of the workpiece.

Chucking devices of the kind made reference to are relatively expensive and must be especially modified to accommodate the workpiece which is to be machined. For careful machining of the ultimate product the chucking device must be well and capably constructed so as to stand continued heavy use over relatively long periods of time, irrespective of the number of individual set-ups which may need to be accommodated.

Another disadvantage in the conventional collet-type chucking device resides in having it precisely accommodate workpieces of different diameter while at the same time maintaining required length and depth tolerances in the machining of the workpiece, in that the segments or jaws which are designed to grip the workpiece tend to shift position axially when opening or closing.

It is therefore among the objects of the invention to provide a new and improved workpiece holding device for a lathe where, especially for the collet-type device, the jaws which grip the workpiece move only radially inwardly and outwardly and avoid axial shift, especially where workpieces of different diameter are encountered.

Another object of the invention is to provide a new and improved workpiece holding device for a lathe wherein a single basic unit capable of being attached to the collet actuating unit of the lathe may be permitted to remain in place for multiple machine operations, the base unit being provided with removable jaw members wherein the jaw members only need be changed to accommodate workpieces of different characteristics.

Still another object of the invention is to provide a new and improved workpiece holding device for a lathe equipped with a versatile basic unit of construction such that the basic unit can be used either with collet-type jaws or mandrel-type jaws.

Still further among the objects of the invention is to provide a new and improved workpiece holding device for a lathe which, because of the fact that a single base unit is arranged to operate with interchangeable jaws, the device is relatively low in cost as compared with conventional chucking devices and also cost effective in operation in part because of a relatively simple assembling procedure and in part because the material of the jaws can frequently be of a relatively inexpensive type but sufficient to accommodate the needs of many types of workpieces.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

In the drawings:

FIG. 1 is a longitudinal sectional view of the device set up for collet-type operation.

FIG. 2 is an end elevational view on the line 2—2 of FIG. 1.

FIG. 3 is a cross-sectional view on the line 3—3 of FIG. 1.

FIG. 4 is a cross-sectional view on the line 4—4 of FIG. 1.

FIG. 5 is a longitudinal sectional view similar to FIG. 1 but with a different actuator enabling the device to serve as a mandrel-type device.

FIG. 6 is an end elevational view on the line 6—6 of FIG. 5 partially broken away.

FIG. 7 is a longitudinal sectional view similar to FIGS. 1 and 5 set up for mandrel-type operation using a different portion of the device for engagement by the actuator.

In the embodiment of the invention of FIGS. 1 through 4, inclusive, a typical lathe is represented in part by a spindle 10 and a protective cap 11 and within which is located a draw tube or collet actuating unit 12 of the lathe. Threads on a lathe spindle are primarily for the purpose of mounting a chuck. The cap is a protective measure against thread damage and is conventionally round and secured with a spanner wrench.

The workpiece holding device of the invention is embodied in part in what may be identified as a base unit indicated generally by the reference character 15 and which consists of a shank 16 at one end having a tapered exterior 17 adapted to fit into the end of the spindle 10 and at the other end a set of radially movable elements comprising circumferentially disposed segments 18, 19 and 20. Slits 21, 22 and 23 separate the segments.

Extending through the shank is a bore 24, at the inner end of which is a hexagonal recess 25. The outer end of the bore joins a composite bore 26 located radially inwardly of the respective segments 18, 19 and 20.

For engagement with a workpiece 30 there is provided a set of work-holding members comprising in the chosen embodiment three jaws 31, 32 and 33. The jaws 31, 32 and 33 are held in place on the respective segments 18, 19 and 20 by screws 34 which extend from the inside ends of the segments outwardly into the respective jaws. Three screws are provided for each segment and jaw which may for convenience be referred to as a workpiece engaging assembly.

Keying between the segments and the jaws is provided by arcuate key projections 35 on the segments 18, 19 and 20 adapted to fit into complementary recesses 36 of the jaws 31, 32 and 33. The multiple arcuate projections and respective recesses in the arrangement made reference to are annular and concentric with respect to the axis of rotation of the device.

To manipulate the jaws with respect to the workpiece 30 there is provided an actuator embodied in a shaft 37, the outer end of which is provided with a head 38. On the head 38 is a cam 39, a cam face 40 of which is adapted to engage a cam track 41 on an annular composite projection 42 of the respective segments 18, 19 and 20. As shown in FIG. 1, the head 38 has a screw threaded connection to the outside end of the shaft 37 and is pinned in place by action of a pin 43.

At the opposite end of the shaft 37 there is provided a fitting 45 in threaded engagement with the shaft. On the fitting is a hexagonal section 46 which is received in the hexagonal recess 25 of the shank 16, holding it non-rotatable with respect to the shank. A threaded extension 47 of the fitting 45 is received in a threaded ring 48 of the draw tube 12 where it can be anchored in place by a lock nut 49. When the draw tube 12 is pulled inwardly in a customary conventional manner the shaft 37 is likewise drawn inwardly, the result of which is an inward thrust of the head 38 of the actuator, drawing the cam face 40 against the cam track 41. The action thus described pulls the three segments 18, 19 and 20 and the accompanying jaws 31, 32 and 33 inwardly so that jaw faces 50 engage the workpiece 30 and hold it in position. As can be noted, there is only radial movement inwardly of the jaws unaccompanied by an axial shift in position.

The same actuator set-up of FIG. 1 can also be made use of serving as a mandrel, as shown in FIG. 5. A workpiece 55 is provided with a relatively small central bore 56 adapted to be engaged and held by mandrels 57, 58 and 59. To accomplish this, on this occasion, jaws 60, 61 and 62 are substituted for the previously identified jaws 31, 32 and 33. Since the jaws 60, 61 and 62 on this occasion need to move radially outwardly, a different actuator is made use of wherein a head 63 for the actuator shaft 37 provided with an outwardly directed cam face 64 moves against an inwardly directed cam track 65 of the multiple projection 42. When on this occasion the shaft 37 is drawn inwardly by customary action of the draw tube of the lathe, the segments 18, 19 and 20 are moved outwardly, moving the corresponding jaws 60, 61 and 62 outwardly, the result of which is to press the mandrel elements 57, 58 and 59 outwardly into their engaging position with the central bore 56 of the workpiece 55. In an arrangement of the kind just described, the diameter of the central bore 56 of the workpiece 65 can be relatively small, and in fact much smaller than the outside diameter of the head 63.

On those occasions where, as in FIG. 7, a workpiece 70 is of relatively large diameter and provided with an inwardly facing recess 71 of correspondingly large diameter. The jaws may also be of large diameter, as illustrated by jaws 72 and 73, shown in FIG. 7. To accommodate this arrangement, the shaft 37 of the actuator is made somewhat longer so that a head 63' with its cam face 64' is at a location such that the cam face 64' is adapted to engage with a composite cam track 75 on the respective jaws, as shown by the jaws 72 and 73. In this arrangement mandrel elements of the jaws 72, 73, as illustrated by the elements 76 and 77, are moved outwardly into positions of engagement with the recess 71 for retention of the workpiece 70 in position.

I claim:

1. A workpiece holding device for a lathe wherein the lathe is provided with a collet actuating unit and accompanying spindle, said workpiece holding device comprising a base unit having a shank adapted to be mounted on said spindle and a set of radially movable elements comprising a plurality of circumferentially disposed individual segments of said shank, said segments being subject to movement between workpiece holding and workpiece releasing postures for both inside and outside engagement with a workpiece, a set of work-holding members having one workpiece capability, said set of workpiece holding members comprising a separate jaw for each segment, each jaw and corresponding segment comprising a workpiece engaging assembly, and removable means of attachment between each jaw and the respective segment, a separate actuator element for said base unit having a range of alternative axial movement outwardly and inwardly relative to the collet actuating unit and accompanying spindle and an actuating engagement with said workpiece engaging assembly, and means on said actuator element for providing an attachment to said collet actuating unit, each jaw being removable from the respective segment for replacement with a jaw of another set of workpiece holding members which has another workpiece engaging capability, a cam structure on the interior of said set of segments having a cam track thereon and a cam on said actuator positioned for engagement with said cam track in a direction effecting radially inward movement of said workpiece engaging assemblies whereby said jaws engage in a radially inwardly direction against said workpiece.

2. A workpiece holding device as in claim 1 wherein there is a cam structure on the interior of said set of segments having a cam track thereon and a cam on said actuator positioned for engagement with said cam track in a direction effecting radially outward movement of said workpiece engaging assemblies whereby said jaws engage in a radially outward direction against said workpiece.

3. A workpiece holding device as in claim 1 wherein there is a radially inwardly facing cam track extending around interior surfaces of the respective jaws and the respective actuator has an enlargement thereon with a radially outwardly facing cam face on said enlargement complementary with respect to said cam track whereby to effect radially outward movement of said workpiece engaging assemblies.

4. A workpiece holding device as in claim 1 wherein there is a substantially cylindrical mandrel on said set of jaws for engaging said workpiece having a diameter less than the diameter of the cam on said actuator.

5. A workpiece holding device as in claim 1 including complementary key means on respectively the base unit and said set of workpiece holding members whereby to precisely locate said jaws on the respective segments.

6. A workpiece holding device as in claim 5 wherein one of said key means is an annular protrusion and the other of said key means is an annular recess.

7. A workpiece holding device as in claim 1 wherein said removable means comprises a plurality of screws extending between the segment and the respective jaw.

8. A workpiece holding device as in claim 6 wherein said removable means comprises a plurality of screws extending through each segment and the respective jaw at the location coincident with said key means.

9. A workpiece holding device as in claim 1 wherein said actuator comprises a shaft having an inside threaded end for engagement with the collet actuating unit and an outside end having ahead member for engagement with said workpiece engaging assemblies.

10. A workpiece holding device as in claim 9 wherein there is a linkage between said actuator and the collet actuating unit, said linkage having an inside end adated for operating attachment to said spindle and having an outside end for releasable reception of the inside threaded end of said actuator whereby said actuator may be removed and replaced without removal of said linkage.

11. A workpiece holding device as in claim 10 wherein said linkage has a non-rotatable and axially releasable engagement with the shank of the base unit.

12. A workpiece holding device for a lathe wherein the lathe is provided with a collet actuating unit and accompanying spindle, said workpiece holding device comprising a base unit having a shank adapted to be mounted on said spindle and a set of radially movable elements comprising a plurality of circumferentially disposed individual segments on said shank, said segments being subject to movement between workpiece holding and workpiece releasing postures, a set of work-holding members having one workpiece capability, said set of workpiece holding members comprising a separate jaw for each segment, each jaw and corresponding segment comprising a workpiece engaging assembly, and removable means of attachment between each jaw and the respective segment, an actuator having an actuating engagement with said workpiece engaging assembly, and means on said actuator for providing a driven engagement with said collet actuating unit, each jaw being removable from the respective segment for replacement with a jaw of another set of workpiece holding members which has another workpiece engaging capability, there being a cam structure on the interior of said set of segments having cam tracks thereon positioned in opposite directions and a plurality of said actuators, one of said actuators having a cam thereon positioned for engagement with one of said cam tracks in a direction effecting radially inward movement of said workpiece engaging assemblies whereby said jaws engage radially inwardly against said workpiece, another of said actuators having a cam thereon positioned for engagement with another of said cam tracks in a direction effecting radially outward movement of said workpiece engaging assemblies whereby said jaws alternatively engage in a radially outward direction against said workpiece.

13. A workpiece holding device as in claim 12 wherein said cam structure and the cam tracks thereon are annular and concentric and the cams on the respective actuators are complementarily annular.

* * * * *